US008342339B2

(12) United States Patent
Cole

(10) Patent No.: US 8,342,339 B2
(45) Date of Patent: Jan. 1, 2013

(54) SPORT ACCESSORY STAND

(76) Inventor: Robert James Cole, San Mateo, CA (US)

( * ) Notice: Subject to any disclaimer, the term of this patent is extended or adjusted under 35 U.S.C. 154(b) by 594 days.

(21) Appl. No.: 12/008,557

(22) Filed: Jan. 11, 2008

(65) Prior Publication Data
US 2008/0223800 A1 Sep. 18, 2008

Related U.S. Application Data

(60) Provisional application No. 60/884,611, filed on Jan. 11, 2007.

(51) Int. Cl.
*A47F 7/00* (2006.01)

(52) U.S. Cl. ........................................................ 211/22

(58) Field of Classification Search .................. 211/195, 211/85.7, 5, 17–22, 189, 175, 182; D12/115
See application file for complete search history.

(56) References Cited

U.S. PATENT DOCUMENTS

| | | | | | |
|---|---|---|---|---|---|
| 529,827 | A | * | 11/1894 | Fonda | 211/22 |
| 574,689 | A | * | 1/1897 | Stover et al. | 211/20 |
| 581,585 | A | * | 4/1897 | Hirschman et al. | 211/21 |
| D27,015 | S | * | 5/1897 | Myers | D12/115 |
| 588,376 | A | * | 8/1897 | Banker et al. | 211/17 |
| D27,769 | S | * | 10/1897 | Pine | D12/115 |
| 603,422 | A | * | 5/1898 | Burkhardt | 211/22 |
| 1,241,486 | A | * | 10/1917 | Armstrong | 211/17 |
| 3,202,289 | A | * | 8/1965 | Burditt | 211/22 |
| 3,785,500 | A | * | 1/1974 | Kennelly | 211/5 |
| 3,786,928 | A | * | 1/1974 | Johnson | 211/5 |
| 3,941,406 | A | * | 3/1976 | Eggleston | 410/3 |
| 4,733,810 | A | * | 3/1988 | Graber et al. | 224/329 |
| 5,133,461 | A | * | 7/1992 | Martinell | 211/21 |
| 5,149,901 | A | * | 9/1992 | Boor et al. | 84/327 |
| 5,238,125 | A | * | 8/1993 | Smith | 211/5 |
| D369,576 | S | * | 5/1996 | Johnson et al. | D12/115 |
| 6,234,432 | B1 | * | 5/2001 | Piller et al. | 248/129 |
| 6,257,419 | B1 | * | 7/2001 | Kamysiak | 211/22 |
| 6,655,562 | B2 | * | 12/2003 | Jeong | 224/282 |
| 6,691,878 | B1 | * | 2/2004 | Ouitz | 211/104 |
| 6,868,976 | B1 | * | 3/2005 | Lassanske et al. | 211/22 |
| 6,948,621 | B1 | * | 9/2005 | Lassanske et al. | 211/22 |
| 7,108,140 | B2 | * | 9/2006 | Whitnall et al. | 211/22 |
| D591,649 | S | * | 5/2009 | Koshes et al. | D12/115 |
| 2006/0266717 | A1 | * | 11/2006 | Tsai | 211/17 |

* cited by examiner

*Primary Examiner* — Jennifer E. Novosad
(74) *Attorney, Agent, or Firm* — Daniel M. Chambers

(57) ABSTRACT

Aspects of the invention include a sport accessory support stand. In some aspects, the sport accessory support stand is configured for retaining a sport accessory. In certain embodiments, the sport accessory support stand includes a base member and a support member wherein the support member is configured for being associated with the base member. In certain embodiments, the support member includes a plurality of post elements which extend away from the base member, wherein each of the post elements are positioned relative to one another so as to form a receptacle there between for receiving a portion of a sport accessory. In certain embodiments, the receptacle comprises a first width and a second width. For instance, in certain embodiments, the receptacle comprises a first width that is configured for receiving a portion of a bicycle, e.g., a front wheel portion, and the receptacle comprises a second width that is configured for receiving a portion of a scooter, e.g., a front portion of an inline foot scooter. In certain embodiments, the support stand is collapsible. Methods of assembling and using the support stand for supporting and/or storing one or more sports accessories are also provided herein.

15 Claims, 11 Drawing Sheets

SPORT ACCESSORY STAND

RELATED APPLICATIONS

This application claims the benefit of U.S. Provisional Application No. 60/884,611, filed Jan. 11, 2007, and entitled Bicycle And Inline Foot Scooter Stand, which application is hereby incorporated by reference herein in its entirety.

BACKGROUND OF THE INVENTION

Foot scooters, such as in-line foot scooters, are very popular children's toys. Millions of in-line foot scooters are sold per year. An in line foot scooter typically includes a pair of in line wheels that are separated one from the other by an intervening foot board. A single vertical guide shaft, with handlebars attached thereto, is positioned at a front end of the scooter. The vertical guide shaft is rotatably associated with a front wheel axle so as to allow a user to steer the scooter by moving the position of the handlebars and thereby changing the direction of movement of the front wheel. Typically, in-line foot scooters are designed to be collapsible.

Although in line foot scooters are collapsible, and therefore, relatively easy to store, for instance, in a cupboard, the collapsing process is laborious and time consuming. Many users, therefore, simply leave the scooter lying flat on the ground or lean it against a wall, where it may slip and fall to the ground. Such storage practices are problematic because when lying flat on the ground, scooters are hard to see and easy to trip and/or drive over, thereby presenting an unseen hazard that could cause physical damage to a person who trips and/or a vehicle that drives over scooter. Further, because of the movable association between the vertical guide shaft and the foot board, picking up of the scooter off of the ground by the handlebars often results in the foot board rotating with respect to the guide shaft, which rotation can cause injury to the person picking up the scooter as the footboard may swing out and hit the unwary person. To date it is difficult, if not impossible, to find a scooter stand for storing and/or supporting a scooter in an upright, non-collapsed configuration.

Bicycle stands, however, for supporting and/or storing a bicycle in an upright position while the bicycle is not in use are well known in the art. There are several different types of well known bicycle stands. For instance, many bicycles come equipped with a kick stand attached to the frame of the bike. A kick stand is a bar-arm element that is pivotally mounted to the rear of the bike, which kick stand can be deployed by causing the bar-arm element to swing below the frame of the bicycle in such a manner so as to engage the ground and thereby support the bicycle while the bicycle is not in use.

Kick stands can be problematic, however, because they add weight to the bicycle, which added weight may detract from the performance of the bicycle. For this reason, many bicycle manufactures do not equip the bicycles produced with a kick stand. Additionally, for those bicycles that come equipped with a kick stand, many users end up removing the kick stand so as to reduce the weight of the bicycle and increase its overall performance. The absence of a kick stand, however, results in the problem of where and how to store the bicycle while it is not in use. Further, even when a kick stand is included, due to where it is typically mounted on the bicycle, the bicycle can still easily tip over causing damage to the bicycle and/or surrounding article. For these reasons, when the bicycle is not in use many bicycle users lean the bicycle against a wall, where it could slip and fall to the ground, or simply rest the bicycle on the ground, thereby creating a hazard because the prone bicycle is difficult to see.

Other types of bicycle stands include a foundational member to which a pair of extended upright brackets is attached. The brackets are spaced apart from one another so as to form a wheel-slot within which a front wheel of a bicycle may be inserted. In this manner, a front wheel of a bicycle may be inserted into the wheel-slot and the bicycle may thereby be stored in an upright position. These stands, however, suffer from several draw backs in that they are bulky, require installation, and are difficult to move and/or store when the stand itself is not in use for storing a bicycle. Further, because these stands are solely designed to store bicycles, they are not well suited for storing a foot scooter, such as an in line foot scooter.

What is needed, therefore, is a light-weight, collapsible stand that is configured for supporting one or more sports accessories, such as one or more of a bicycle and/or a scooter, in an upright position so as to store the one or more sports accessories while not in use. The subject disclosure presented herein meets these and other needs in the art.

SUMMARY OF THE INVENTION

Aspects of the disclosure include a sport accessory support stand. In some aspects, the sport accessory support stand is configured for retaining a sport accessory. In certain embodiments, the sport accessory support stand includes a base member and a support member wherein the support member is configured for being associated with the base member. In certain embodiments, the support member includes a plurality of post elements which extend away from the base member, wherein each of the post elements are positioned relative to one another so as to form a receptacle there between for receiving a portion of a sport accessory. In certain embodiments, the receptacle comprises a first width and a second width. For instance, in certain embodiments, the receptacle comprises a first width that is configured for receiving a portion of a bicycle, e.g., a front wheel portion, and the receptacle comprises a second width that is configured for receiving a portion of a scooter, e.g., a front portion of an inline foot scooter. In certain embodiments, the support stand is collapsible. Methods of assembling and using the support stand for supporting and/or storing one or more sports accessories are also provided herein.

BRIEF DESCRIPTION OF THE DRAWINGS

According to common practice, the various features of the drawings may not be presented to-scale. Rather, the dimensions of the various features may be arbitrarily expanded or reduced for clarity. Included in the drawings are the following figures.

DEFINITIONS

Figure 1A:
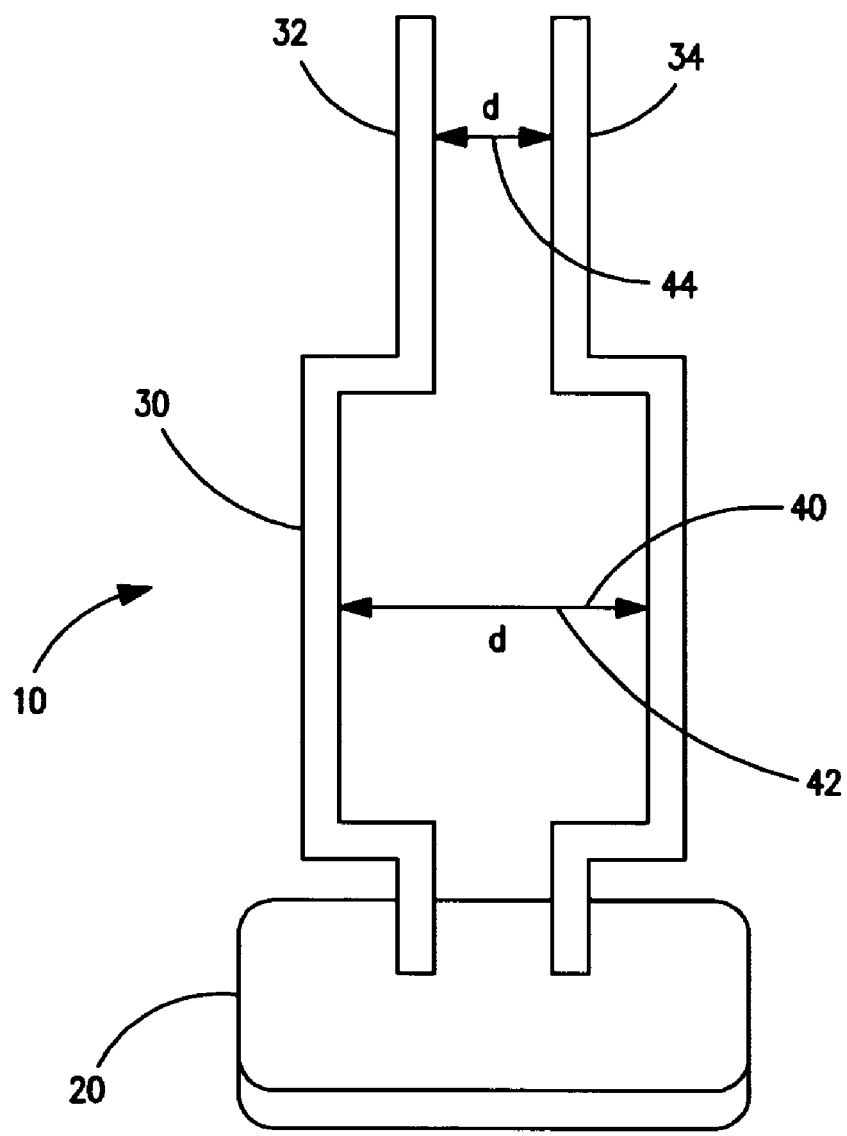
FIG. 1 depicts a representative embodiment of a subject sports accessory support stand.

Before the present invention is further described, it is to be understood that this invention is not limited to particular embodiments described, as such may of course vary. It is also to be understood that the terminology used herein is for the purpose of describing particular embodiments only, and is not intended to be limiting. Unless defined otherwise, all technical and scientific terms used herein have the same meaning as commonly understood by one skilled in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Throughout this application, various publications, patents and published patent applications are cited. The disclosures of these publications, patents and published patent applications referenced in this application are hereby incorporated by reference in their entirety into the present disclosure. Citation herein by the Applicant of a publication, patent, or published patent application is not an admission by the Applicant of said publication, patent, or published patent application as prior art.

It must be noted that as used herein and in the appended claims, the singular forms "a", "and", and "the" include plural referents unless the context clearly dictates otherwise. Thus, for example, reference to a "base member" includes a plurality of such members, and reference to "the support member" includes reference to one or more support members and equivalents thereof known to those skilled in the art, and so forth. It is further noted that the claims may be drafted to exclude any optional element. As such, this statement is intended to serve as antecedent basis for use of such exclusive terminology as "solely", "only" and the like, in connection with the recitation of claim elements, or the use of a "negative" limitation.

In this specification and in the claims that follow, reference will be made to a number of terms, which shall be defined to have the following meanings:

"Optional" or "optionally present"—as in an "optional additive" or an "optionally present additive" means that the subsequently described component (e.g., additive) may or may not be present, so that the description includes instances where the component is present and instances where it is not.

The term "sports accessory" means any form of equipment that is typically stored via the use of an equipment stand whether the equipment is related to a sports, athletic, recreational activity or not. Such representative accessories and/or equipment includes, but is not hereby limited to, wheeled sports equipment, such as, bicycles, including, mountain bikes, road cycles, down-hill bicycles, unicycles, and the like; scooters, including, in-line foot scooters, such as RAZOR™ scooters, motorized scooters, non-inline scooters, and the like; motorized bicycles, motorbikes, motorcycles, mopeds; skateboards; rollerblades; and the like.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

DETAILED DESCRIPTION

Aspects of the disclosure include a sport accessory support stand. In some aspects, the sport accessory support stand is configured for retaining a sport accessory. In certain embodiments, the sport accessory support stand includes a base member and a support member wherein the support member is configured for being associated with the base member. In certain embodiments, the support member includes a plurality of post elements which extend away from the base member, wherein each of the post elements are positioned relative to one another so as to form a receptacle there between for receiving a portion of a sport accessory. In certain embodiments, the receptacle comprises a first width and a second width. For instance, in certain embodiments, the receptacle comprises a first width that is configured for receiving a portion of a bicycle, e.g., a front wheel portion, and the receptacle comprises a second width that is configured for receiving a portion of a scooter, e.g., a front portion of an inline foot scooter. In certain embodiments, the support stand is collapsible. Methods of assembling and using the support stand for supporting and/or storing one or more sports accessories are also provided herein.

The subject sport accessory support stand of the disclosure will be described first, followed by a description of its assembly and its use for the support and storage of one or more sports accessories, such as a bicycle and/or scooter.

Sport Accessory Stand

As summarized above, in some aspects, the subject disclosure provides for a sport accessory support stand, which support stand may be fabricated from a light-weight material and be collapsible. Accordingly, the subject stand may be portable, easy to assemble and disassemble, and may be configured for engaging one or more different types of sports accessories in such a manner as to support and/or store the various sports accessories in an up right manner. Hence, the support stands of the present disclosure allow for the efficient and safe storage of a plurality of sports accessories, such as both bicycles and scooters, either alone or concurrently. In some aspects, the subject disclosure provides a sport accessory support member for attachment to a preexisting sports accessory stand so as to allow the stand to accommodate an additional sports accessory, such as a scooter.

Accordingly, in certain embodiments, the subject disclosure provides for a sport accessory support stand for retaining a sport accessory. In certain embodiments, the support stand includes one or more of a base member and a support member. In certain embodiments, the support member includes a plurality of extended (e.g., longitudinally) post elements that are spaced apart from one another and/or otherwise positioned relative to one another so as to form a receptacle there between for receiving a portion of a sport accessory, such as a scooter, wherein the receptacle includes a first width and a second width. In certain embodiments, a perch element adapted to be associated with the support member may also be included.

The Base and Apex Members

In certain embodiments, a support stand of the subject invention includes a base member. A suitable base member may be any component that is capable of interacting with a support member so as to provide a foundational structure for the support member. For instance, in certain embodiments, a suitable base member may be any member upon which a support member rests and is thereby supported. For example, a suitable base member may be a structure that is configured for supporting and positioning a support member in a position, e.g., a raised position, such that the support member is capable of engaging a sports accessory and thereby supporting and/or storing the sports accessory. Accordingly, in certain embodiments, the base member is configured so as to act as a foundation for the over all stand support as a whole, whether the supported stand is unloaded, partially loaded, or loaded to its full capacity with one or more sports accessories.

A suitable base member may be of any suitable size, shape, and dimension so long as it is capable of providing a structure for the overall stand support as a whole. For instance, in certain embodiments, the base member may be flat or tubular. In certain embodiments, the base member may have a circular, semi-circular, triangular, square, rectangular, trapezoidal, diamond, pentagonal, hexagonal, or other such shape. In certain embodiments, the base member may have a flat configuration and may be positioned horizontally in relationship to the plane upon which the stand as a whole rests (e.g., the base member may rest horizontally flat on the ground).

In certain embodiments, the base member may have an extended, tubular configuration, wherein the base member extends laterally. In certain embodiments, the base member may be tubular and be extended in the vertical direction, that is normal to the plane upon which the stand as a whole rests (e.g., the base member may be extended vertically away from the ground). Hence, in certain embodiments, the base member may comprise a substantially horizontal configuration, and therefore, have a predominantly extended lateral or x-axis dimension, and/or in certain embodiments, the base member may comprise a substantially vertical configuration, and have a predominantly extended longitudinal or y-axis dimension.

Specifically, in certain embodiments, the base member may have one or more surface dimensions. For instance, in certain embodiments, the base member may be tubular and may be extended such that the base member includes a proximal portion with a proximal end, a distal portion with a distal end, and an intercalating portion between the proximal and distal portions. The various portions of the base member may be fabricated from a single piece of material such that the portions are coextensive with one another, or the various portions may be fabricated so as to form a plurality of pieces that are moveable with respect to one another.

For example, in certain embodiments, the base member may be comprised of two or more pieces that are capable of moving in relationship to one another. Hence, in certain embodiments, the two or more pieces of the base member are configured to be fit one within the other in the fashion of a telescope. Accordingly, in certain embodiments, the base member includes two or more segments that may be fit one within the other such that the base member constitutes a telescoping base member. In this manner, the base member, as well as the stand in general, is capable of being extended or retracted in size.

The base member may be extended and therefore have a length dimension, a width dimension, and a height dimension, as well as a top surface, bottom surface, end surfaces, and a plurality of side surfaces. For instance, in various representative embodiments, dependent in part on the material from which it is made, a suitable base member may have a length that ranges from about 2 or about 5 inches to about 24 or about 36 inches or about 48 inches or about 96 inches or more, such as from about 12 or about 18 inches to about 60 or about 72 inches, including about 40 inches. In certain embodiments, a suitable base member may have a width that ranges from 5 or 10 mms to about 1 or about 3 or about 5 or 6 inches or more, including from about ¼ or about ½ inch to about 2 or about 4 inches. In certain embodiments, a suitable base member may have a height that ranges from a few millimeters to several inches, such as from about less than 1, 1 or 2 mms, or about 10 or about 20 or about 50 mms to about 4 to about 6 inches or more, such as from about ¼ or about ½ inch to about 3 inches, from about 1 inch to about 2 inches, including about 1.5 inches. In certain embodiments, a suitable base member may have a combination of different length, width or thickness dimensions, for instance, when the base member is in the configuration of a planar triangle, square, rectangle, trapezoid, circle, or semi-circle.

A base member of the subject invention may be fabricated from any suitable material in accordance with methods well known in the art. For instance, a suitable base member material, such as a metal or rigid plastic, may be used to fabricate a base member using a method such as casting, e.g., into a mould, machining, welding, pressing, fabricating, cutting, e.g., excision by a laser, or the like. The base member may be fabricated from a single piece of material or from a composite of materials. A suitable material may be any material capable of forming a base member and rigid enough to act as a foundation for all the other components of the support stand, as well as the overall stand itself. Such materials include, but are not hereby limited to, metals and alloys; such as iron, lead, steel, titanium, aluminum, and the like; and rigid plastics, such as PVC, polypropylene, polystyrene, ABS, PET, polycarbonate, and the like.

In certain embodiments, the base member is configured for being associated with one or more other components of the support stand assembly. For instance, a base member may be configured for being associated with one or more of an additional base member(s), a base member connector, a support member, an apex member, a perch element, a foot or pad member, a locking element, and/or the like. For example, in certain embodiments, the base member is configured for being associated, e.g., moveably or non-moveably associated, with a second base member, which second base member is spaced apart from the first base member. Specifically, in certain embodiments, the support stand includes a plurality of laterally extended, tubular base members that are spaced apart from and substantially parallel or transverse to one another. In this manner the plurality of base members provide a foundation upon which one or more support members may be associated so as to allow one or more sports accessories to be supported and/or stored thereby.

In embodiments wherein a plurality of base members are included, the base members may be associated with one another via a connector that is configured at least in part for connecting the two or more base members to one another. In certain embodiments, the connector element is removeably and/or moveably attached to the base members by a suitable attachment member, and in certain embodiments, the connector is fabricated to be coextensive with the base members and/or otherwise non-moveably attached thereto. A suitable connector may be any element that is configured for connecting the two base members together either directly or indirectly. For instance, a connector may simply be a transverse element that is positioned substantially planar but perpendicular to the two base members, which element may directly connect the two base members together, for example, by attaching, e.g., moveably attaching, to the intercalating portion of the two base members.

In other embodiments, a connector may be a raised end member or a plurality of raised end members that are positioned at the distal and/or proximal ends of the base members (e.g., by a suitable attachment member or may be coextensive therewith). Such a connector(s) may extend vertically away from the base members, but at an angle toward one another such that the connector(s) meet vertically above the end members to form a triangular shape. In this manner the two proximal ends of the base members may be connected, and/or the two distal ends of the base members may be connected by connectors so as to form two separate connector triangles. Further, in certain embodiments, the two separate connector triangles may themselves be angled toward one another and connected at an apex so as to form a tepee, or they may rise substantially perpendicularly away from the base members but be connected by an intervening apex member that spans the distance between the two connector triangles at each end of the base members.

In certain embodiments, the apex of a connector triangle or tepee includes a moveable e.g., a pivoting, joint member, such that the two base members may be moved either closer or further away from one another, by articulating the joint member to move the connectors toward or away from one another and thereby manipulating the distance between the two base members. In certain embodiments, a horizontally planar connector may be included, wherein the connector includes a track member to which the two base members may be moveably associated so as to allow the base member to be positioned closer or further away from one another, for example, in ratcheting or sliding fashion along the track member. Accordingly, a suitable locking member may also be included so as to lock the base members in a predetermined position. In this manner, the support stand is capable of being minimized and/or collapsed, for instance, for storage when not in use.

Although each connector triangle has been described as being composed of two separate connector elements joined together at an apex, it is understood that only a single triangular shaped connector element need be included wherein the two legs of the triangular shaped connector join to the two separate ends of the base members. Further, although the connectors have been described as joining the two distal ends and the two proximal ends of two separate base members, it is understood that the connectors may join a proximal and a distal end of the same base member to form a connector triangle, which connector triangle may be angled toward a corresponding connector triangle of a second base member. Further still, although the connector elements have been described as forming a connector triangle, it is understood that other shapes are also possible with the appropriate modifications, for instance, the connectors can be shaped to form circles, or semi-circles, and squares or rectangles (e.g., wherein the connectors rise vertically from the base member but are not angled toward one another), and the like (e.g., with the addition of an extended apex section positioned between the two vertically raised connector portions). In certain embodiments, as is described in greater detail herein below, a suitable connector joining two base members together may be a support member.

In certain embodiments, the support stand includes an apex member. For instance, as described above, in certain embodiments, the base member is configured for being connected with an apex member. The base member may be joined to the apex member in any suitable fashion, for example, by a suitable connector element, by a support member, or dependant on the shape of the base member, the base member itself may be configured in such a manner that a portion of the base member also forms a suitable apex member.

In certain embodiments, a suitable apex member is an extended member or joint member that is spaced apart, e.g., longitudinally, from the one or more base members. For example, where the apex member is an extended member, it may include dimensions that are equivalent to the base member(s) and be configured for attachment to one or more support members and/or one or more connector elements. Where the apex member is a joint member, the joint member may simply be configured for receiving and/or otherwise attaching a plurality of connector elements or connector triangles together in moveable relationship to one another. Accordingly, a suitable apex member may be configured for being associated, e.g., moveably or non-moveably associated, with a support member, and may further be associated, in a moving or non-moving manner, with one or more connector elements which form a connector triangle or tepee, and in this manner the apex member may be in directly connected to a base member.

In certain embodiments, the apex member may have one or more surface dimensions. For instance, in certain embodiments, the apex member may be tubular and may be extended such that the apex member includes a proximal portion with a proximal end, a distal portion with a distal end, and an intercalating portion between the proximal and distal portions. The various portions of the apex member may be fabricated from a single piece of material such that the portions are coextensive with one another, or the various portions may be fabricated so as to form a plurality of pieces that are moveable with respect to one another.

For example, in certain embodiments, the apex member may be comprised of two or more pieces that are capable of moving in relationship to one another. Hence, in certain embodiments, the two or more pieces of the apex member are configured to be fit one within the other in the fashion of a telescope. Accordingly, in certain embodiments, the apex member includes two or more segments that may be fit one within the other such that the apex member constitutes a telescoping apex member. In this manner, the apex member, as well as the stand in general, is capable of being extended or retracted in size.

The apex member may be extended and therefore have a length dimension, a width dimension, and a height dimension, as well as a top surface, bottom surface, end surfaces, and a plurality of side surfaces. For instance, in various representative embodiments, dependent in part on the material from which it is made, a suitable apex member may have a length that ranges from about 2 or about 5 inches to about 24 or about 36 inches or about 48 inches or about 96 inches or more, such as from about 12 or about 18 inches to about 60 or about 72 inches, including about 40 inches. In certain embodiments, a suitable apex member may have a width that ranges from about 5 or about 10 mms to about 1 or about 3 or about 5 or 6 inches or more, such as from about ¼ or about ½ inch to about 2 or about 4 inches. In certain embodiments, a suitable apex member may have a height that ranges from a few millimeters to several inches, such as from about less than 1, 1 or 2 mms, or about 10 or about 20 or about 50 mms to about 4 to about 6 inches or more, such as from about ¼ or about ½ inch to about 3 inches, from about 1 inch to about 2 inches, including about 1.5 inches. In certain embodiments, a suitable apex member may have a combination of different length, width or height dimensions. In certain embodiments, the apex member has equivalent dimensions as a base member, and in certain embodiments, the apex member is shorter, longer, thinner, wider, etc. than the base member.

An apex member of the subject invention may be fabricated from any suitable material in accordance with methods well known in the art. For instance, a suitable apex member material, such as a metal or rigid plastic, may be used to fabricate a base member using a method such as casting, e.g., into a mould, machining, welding, pressing, fabricating, cutting, e.g., excision by a laser, or the like. The apex member may be fabricated from a single piece of material or from a composite of materials. A suitable material may be any material capable of forming an apex member and rigid enough to act as a structural support for the overall stand. Such materials include, but are not hereby limited to, metals and alloys; such as iron, lead, steel, titanium, aluminum, and the like; and rigid plastics, such as PVC, polypropylene, polystyrene, ABS, PET, polycarbonate, and the like.

The Support Member

In certain embodiments, a support stand of the subject invention includes a support member. A suitable support member may be any member that is configured such that it includes a receptacle that is capable of receiving and retaining a sport accessory, such as one or more of a portion of a bicycle or scooter. In certain embodiments, the support member is configured for attachment to a base member and/or an apex member. For instance, in certain embodiments, the support member is interposed between a base and an apex member and is capable of acting as a stabilizer, support, and/or storage receptacle for a sport accessory positioned therein. Accordingly, in certain embodiments, the support member connects a base member and an apex member and may therefore serve the function of a connector element. In certain embodiments, the support member associates only with either a base or an apex member. In certain embodiments, the support member includes a curved portion, which curved portion performs the function of a base member and/or apex member.

A suitable support member may be of any suitable size, shape, and dimension so long as it is capable of providing a receptacle that is configured for receiving at least a portion of one or more, e.g., a plurality, of sports accessories. In certain embodiments, the support member may be extended and therefore include a proximal portion, with a proximal end, a distal portion with a distal end, and an intercalating portion. Hence, a support member may have a height dimension, a width dimension, and a thickness dimension, as well as a top surface, bottom surface, end surfaces, and a plurality of side surfaces. For instance, in various representative embodiments, dependent in part on the material from which it is made, a suitable support member may have a height that ranges from about 6 or about 9 inches to about 12 or about 18 inches or about 24 inches or about 48 inches or more, such as from about 10 or about 15 inches or about 20 inches to about 27 or 28 or about 30 or about 40 inches, including about 36 inches. In certain embodiments, a suitable support member may have a width that ranges from about 1 or about 10 mms or about 1 inch to about 3 or about 5 or about 6 or 10 inches or more, including about ¼ or about ½ inch to about 2 or about 4 inches. In certain embodiments, a suitable support member may have a thickness that ranges from a few millimeters to several inches, such as from about less than 1, 1 or 2 mms, or about 3 or about 5 or about 10 mms to about 1 to about 2 inches or more, such as from about ¼ or about ½ inch to about 3 inches, from about ¾ inch to about 1.75 inches, including about 1.5 inches.

In certain embodiments, the proximal portion of the support member may have a height, width, or thickness dimension that is different from a corresponding dimension of a distal portion of the support. For instance, the proximal and or distal portions of the support may have one or more of the dimensions recited above whereas the corresponding distal or proximal portion, respectively, has a dimension such as one of the dimensions recited above that is different from that of the corresponding portion. In certain embodiments, the support member includes an intercalating portion wherein the intercalating portion is adjustable. For instance, in certain embodiments, the length of the intercalating portion is adjustable such that the intercalating portion is capable of expanding or contracting, for example, in a telescopic fashion, and in certain embodiments, the intercalating portion is capable of pivoting with respect to one or more of a proximal and/or distal portion of the support.

A support member of the subject invention may be fabricated from any suitable material in accordance with methods well known in the art. For instance, a suitable support member material, such as a metal or rigid plastic, may be used to fabricate a base member using a method such as casting, e.g., into a mould, machining, welding, pressing, fabricating, cutting, e.g., excision by a laser, or the like. The support member may be fabricated from a single piece of material or from a composite of materials. A suitable material may be any material capable of forming a support member and rigid enough to act as a support for a received sport accessory. Such materials include, but are not hereby limited to, metals and alloys; such as iron, lead, steel, titanium, aluminum, and the like; and rigid plastics, such as PVC, polypropylene, polystyrene, ABS, PET, polycarbonate, and the like.

In certain embodiments, the support member includes a plurality of post elements. The post elements may be extended and include a proximal portion with a proximal end, a distal portion with a distal end, and an intercalating portion positioned between the proximal and distal portions.

The post elements may be parallel to one another or angled toward or away from one another. In certain embodiments, the post elements are straight, e.g., do not include curves or bends, and in certain embodiments, the post elements are curved and/or include one or more bends. In certain embodiments, a proximal portion of the support member, e.g., a proximal portion of a post element, is configured for being associated with a base member and may be configured for extending radially therefrom. In certain embodiments, a distal portion of the support member, e.g., a distal portion of a post element, is configured for being associated with an apex member and may be configured for extending radially therefrom. In certain embodiments, the proximal portions of the two posts elements are interconnected, e.g., by a connector portion, and certain embodiments, the distal portions of the two posts elements are interconnected, e.g., by a connector portion.

In certain embodiments, the support member includes a plurality, e.g., two, post elements that are spaced apart from one another so as to form a receptacle there between. The receptacle may be of any size or shape so long as it is capable of receiving and/or retaining one or more sports accessories. In certain embodiments, the post elements are configured such that the receptacle formed there between the two post elements includes a first width and a second width. For example, each post element may include a proximal and a distal portion that is extended and substantially straight but offset from one another. In such an embodiment, the post element may additionally include an intercalating portion joining the offset proximal and distal portions of the post element, wherein the intercalating portion is angled or perpendicular to the proximal and distal portions. Hence, when the proximal and the distal portions of the post element are offset from one another, the angled or perpendicular intercalating portion may join the two portions in an angled, e.g., elbow or L shaped, configuration. In this manner, the two proximal portions of the post elements of the support member will be distanced from one another by one width, and the two distal portions of the post elements will be distanced from one another by a second width.

Accordingly, a suitable receptacle of a support member, e.g., the space between two post elements, may have a plurality of, e.g., two different, widths. For instance, the receptacle may have a first width, e.g., defined by the distance between the proximal portions of a pair of post elements, and a second width, e.g., defined by the distance between the distal portions of the pair of post elements. The first and second widths may correspond to any suitable distance between the post elements, which distance may include a range from about 1 inch to about 15 inches apart or more, such as from about 1.5 or about 2.5 or about 5 inches to about 8 or about 10 or about 12 inches apart, including from about 4 or about 4.5 to about 6 or about 7 inches apart. As described herein above, in certain embodiments, the first and second widths may correspond to different distances, e.g., the two widths may be different. However, in certain embodiments, the two widths may be of equal distances, e.g., the two widths may be the same, for example, in embodiments where the intercalating portion is in plane and not transverse to the proximal and distal portions of the post elements.

In certain embodiments, the receptacle may include a width, e.g., a first width, which is configured for receiving a portion, e.g., a front or rear portion, of a first sports accessory, such as the fork and wheel portion of a bicycle. In certain embodiments, the receptacle may include a width, e.g., a second width, which is configured for receiving a portion, e.g., a front or rear wheel portion, of a second sport accessory, such as a scooter. Accordingly, in certain embodiments, the receptacle is of a dimension and is therefore configured for receiving a first and/or a second sports accessory. For instance, the receptacle may be configured for receiving a portion of a bicycle and/or a portion of a scooter, such as an in line foot scooter.

However, in certain embodiments, the receptacle may include a single width that corresponds to a single distance by which the post elements are separated from one another, which distance is configured for snugly receiving only one sports accessory, such as one only of a bicycle or a scooter. For example, the receptacle may be configured for only receiving and snugly fitting a portion of a bicycle and not a scooter, or the receptacle may be configured for only receiving and snugly fitting a portion of a scooter, albeit, in this configuration a portion of a bicycle may still be able to be fit with the receptacle, but the fit will not be snug.

In certain embodiments, as described above, the support member may be configured for being associated with a suitable base and/or apex member. The support member may be associated with a suitable base or apex member in any suitable manner known in the art. For instance, in certain embodiments, the support member, e.g., a proximal and distal portion thereof, may be moveably and/or removeably associated with a base and/or apex member, respectively. However, in certain embodiments, the support member and/or portions thereof, is non-moveably associated with the base and/or apex member.

For example, where the support member includes two post elements, the individual post elements may be moveably associated with the base and/or apex member, either separately or as a unit, by a moveable bracket and/or groove and/or track element, e.g., where the base and/or apex member includes the groove or track member and the post element includes a corresponding coupling element (e.g., a ball or wheel or the like) and/or at least one of the base, apex, or post elements may include a moveable bracket element. In this manner the post elements may be moveable, e.g., laterally, with respect to the base and/or apex member and/or each other. Where the post elements are moveable with respect to each other, the distance between the posts, and therefore the width(s) of the receptacle defined thereby may be adjustable, that is the one or more widths of the receptacle may be increased or decreased so as to fit, e.g., snugly fit a sports accessory, such as a bicycle or scooter.

In certain embodiments, the support member may be moveably associated with a base and/or apex member in such a manner that the support member is capable of pivoting with relationship to the base and/or apex member. Accordingly, in certain embodiments, a suitable pivoting attachment element attaches the support member to the base and/or apex member. A suitable locking member may be included so as to lock the support member and/or individual post elements in place. In certain embodiments, the support member includes post elements that are connected to one another at one or more of the distal and/or proximal portions so as to form a single support member unit, such as a unit that is interposed between a suitable base and apex member.

In certain embodiments, two or more, for instance, a plurality of support members may be included. For instance, in certain embodiments, two or more support members may be moveably or non-moveably attached to one or more base members, and in certain embodiments, two or more support members may be moveably or non-moveably attached to an apex member. Accordingly, in certain embodiments, two or more support members may be moveably or non-moveably attached to both a base member, or base members, and to an apex member, such as where the two or more support members are interposed between the base and apex members.

For example, in certain embodiments, a sport accessory support of the subject disclosure may include a plurality of base members, a plurality of support members, and an apex member, wherein the base members are laterally spaced apart from one another, the apex member is longitudinally spaced apart from the base members, and at least one support member is interposed between one base member and the apex member and at least one support member is interposed between the other base member and the apex member.

In certain embodiments, the sport accessory support member is configured for being coupled or attached with a separate, pre-existing sport accessory stand. Accordingly, in certain embodiments, the support member includes a configuration for allowing a support member to be coupled to a pre-existing stand so as to allow the stand to receive an additional sports accessory. Hence, the support member may include any configuration that will allow a support member, for instance, as a unit, to be coupled with a pre-existing stand. Such a configuration may include, one or more openings and fasteners, so as to allow the support member to be screwed into the preexisting stand, or the configuration may include a clasps member, bracket member, other attachment member, adaptor member, and the like.

For instance, in certain embodiments, a support member may include an attachment member so as to allow the support member to be removably attached to a pre-existing stand. In certain embodiments, the attachment member may include one or more clasps configurations and/or clasping members, wherein such a clasp configuration and or member is positioned at the proximal and/or distal portion or ends of the support member, so as to allow the proximal and/or distal ends of the support member to be coupled to an elongate portion, for example, of a base and/or apex member of a preexisting sport accessory stand, for instance, by the interaction of the clasping configuration or member with a suitable portion of the base and/or apex member. In certain embodiments, the attachment member includes a bracket member, or suitable opening and fastening members, positioned at the proximal and/or distal ends of the support member, so as to allow the proximal and/or distal ends of the support member to be coupled to a base and/or apex member of a preexisting sport accessory stand.

In certain embodiments, the support member includes an adaptor element that is configured for allowing the support member to be attached to the ends of an already existent sport accessory stand. For instance, the proximal and/or distal ends of the support member may be configured for being attached to an end of a base and/or apex member, which member may either be configured so as to be coupled to the support member, or a suitable adaptor member may be interposed between the ends of the support member and the ends of the base and/or apex member so as to allow the support member to be coupled to the pre-existent stand. Such an adaptor element may include a male-female configuration wherein one of the ends of the support or base member is configured to include a male insertion portion and the corresponding end in the base or support member, respectively, is configured to include a female receiving portion. Alternatively, both ends may be configured as male or female portion which may then be fitted together via the use of a suitably configured adaptor. In this manner the support member may be attached to and/or coupled with a portion of a pre-existing stand so as to allow the pre-existing stand to receive an additional sports accessory.

Further, as set forth above, one or more portions of the support member, e.g., an intercalating portion, may be configured for being adjustable, for instance, in a length or width wise direction, and because of which the support member may be adjusted to fit the dimensions of a variety of pre-existent sports stands or racks.

In certain embodiments, a suitable support member is configured so as to include one or more of a base member portion, a support member portion, and an apex member portion. For instance, in certain embodiments, the support member and/or posts thereof, may be configured to not only form a support member portion but may also form a base member portion and/or a apex member portion, and therefore, in such a configuration a separate base and/or apex member is not necessary, although they may be included nonetheless. For example, in certain embodiments, the support member may be a round or circular element wherein one or more of the post elements are curved. Alternatively, the support member may include additional supporting elements that are curved, which elements may perform the function of a base and/or apex member, whereas the post elements are relatively non-curved. Accordingly, depending on the configuration, a receptacle between the post elements may be curved or non-curved.

In certain embodiments, the sport accessory support stand includes a perch element. A suitable perch element may be any element configured for associating with a support member and/or base member and adapted for interacting with a sport accessory, when the sport accessory is received within the support member. For instance, a suitable perch may be any element that may be attached, e.g., removeably attached, to a base or support member and configured for associating with a sport accessory, such as a scooter, that is received within the support member, e.g., within a receptacle of the support member, so as to position the sport accessory in a manner sufficient to ensure that the sport accessory is retained within the support member, when appropriately positioned therein.

A suitable perch may be of any suitable size, shape, and dimension so long as it is capable of providing a structure and/or support for positioning and/or securing a sport accessory received within the stand. For instance, in certain embodiments, the perch element may be flat or tubular. In certain embodiments, the perch element may have a circular, semi-circular, triangular, square, rectangular, trapezoidal, diamond, pentagonal, hexagonal, or other such shape. In certain embodiments, the perch element may have a raised and flat configuration and may be positioned at an angle in relationship to the plane upon which a base or support member rests. Thus, in certain embodiments, the perch should have a height dimension that allows a portion of a received sport accessory to be lifted and angled so as to slide into and be retained within a receptacle of a support member. In certain embodiments, the perch element should be configured so as not to prevent a sports accessory, such as a wheel of a bicycle, from being received within the support member of the stand.

The perch element may be extended and therefore have a length dimension, a width dimension, and a height dimension, as well as a top surface, bottom surface, end surfaces, and a plurality of side surfaces. For instance, in various representative embodiments, dependent in part on the material from which it is made, a suitable perch element may have a length that ranges from about 10 or about 20 or about 50 mms to about 10 or about 12 or about 15 inches or more, such as from about 1 or about 1.5 or about 2 to about 4.5 or about 5 or about 8 inches. In certain embodiments, a suitable perch element may have a width that ranges from about 1 or about 10 mms to about 1 or about 3 or about 5 or 6 inches. In certain embodiments, a suitable perch element may have a height that ranges from a few millimeters to several inches, such as from about less than 1, 1 or 2 mms, or about 10 or about 20 or about 50 mms to about 4 to about 6 inches or more, such as from about ¼ or about ½ inch to about 3 inches, from about 1 inch to about 2 inches, including about 1.5 inches. In certain embodiments, a suitable perch element may have a combination of different length, width or thickness dimensions, for instance, when the base member is in the configuration of a planar triangle, square, rectangle, trapezoid, circle, or semicircle.

A perch element of the subject invention may be fabricated from any suitable material in accordance with methods well known in the art. For instance, a suitable perch element material, such as a metal or rigid plastic, may be used to fabricate a base member using a method such as casting, e.g., into a mould, machining, welding, pressing, fabricating, cutting, e.g., excision by a laser, or the like. The perch element may be fabricated from a single piece of material or from a composite of materials. A suitable material may be any material capable of forming a perch element and rigid enough to act as a foundation for a received sport accessory. Such materials include, but are not hereby limited to, metals and alloys; such as iron, lead, steel, titanium, aluminum, and the like; and rigid plastics, such as PVC, polypropylene, polystyrene, ABS, PET, polycarbonate, and the like.

As described above the various individual elements and/or portions of the support stand may be moveably or non-moveably joined to one another. Where one or more of the elements or portions are moveably coupled to one another, the elements may include suitable openings, fasteners, and/or locking mechanisms so as to allow the elements to move in relation to one another, be fixed in place, expanded, contracted, configured as desired, and/or broken down, folded up, and stored, or the like. In this manner the support stand of the subject disclosure is capable of being broken down to its component pieces and/or folded upon itself for storage when not in use and rebuilt when use is desired.

Other Useful Elements, Assembly, and Methods of Use

In certain embodiments, one or more components of the support stand, such as a base member and/or other component of the support stand may include one or more of a support pad or wheel element, such as a caster or locking wheel. For instance, in certain embodiments, a moveable pad element or wheel element may be associated with one or more of the components of the stand such that the pad or wheel height can be vertically adjusted. In this manner, where one or more height adjustable pads or wheels are included, the height dimensions of the stand assembly may be adjustable so as to compensate for any deformities of a surface upon which the stand assembly rests.

Further, where locking wheels are included, the stand assembly, whether fully or partially loaded or not loaded at all, may be moved as desired and when appropriately positioned, the wheels may be locked so as to prevent any further movement. Additionally, where pad members are included, the pad components may be configured for bearing associated with one or more of a base component and/or a stabilizing leg member, or other component and may be height adjustable. The pad members may be made out of any suitable material such as metal, plastic, rubber, or the like and may be associated, for instance, with the corners of the base member or along the bottom of the leg members.

Additionally, in certain embodiments, the sports accessory support stand is configured for locking a received sports accessory within a receptacle of the support stand. For instance, the support stand may include one or more locking and or clasping elements, as is well known in the art. For example, an apex or support member may include a clasping element that is configured for locking a received sports accessory, such as a scooter, within the stand. Specifically, a clasping element may be configured to extend from one post element to another of the support member, for instance, once a sport accessory is received within a receptacle there between, and thereby lock the accessory in place. A suitable locking element may further be provided so as to prevent the clasping element from being reopened unless unlocked. A suitable clasping element may have any configuration known in the art such as a latch, chain, wire, or the like.

Further, as described above, the various components of the stand assembly may include suitable openings and fasteners, whereby the various components may be removeably attached to one another. In this manner the stand may be broken down to its component pieces and stored when not in use, and be rebuilt when use is desired. Specifically, in certain embodiments, the subject disclosure is directed to a method of assembling, using, and disassembling the subject rack as desired.

For instance, one or more of a suitable base member, support member, and/or apex member may be provided, wherein the support member, and/or post elements thereof, are coupled with the base member and attached thereto, e.g., by clasping interaction, insertion of screws, etc. The support member and/or post elements thereof are coupled with the apex member and attached thereto, e.g., by clasping interaction, insertion of screws, etc. One or more perch members may be associated with a base or support member and be aligned to engage a sports accessory.

Once the desired configuration of the stand assembly is achieved, the configuration may be locked in place by engaging one or more locking mechanism, which may be included to lock the various members in place in relation to one another. Once the desired configuration of the stand assembly is achieved, one or more sports accessories may be inserted into the support member, e.g., within a receptacle thereof, and be positioned to be retained therein. After use, the reverse steps may be followed so as to break down the stand assembly for storage.

Various individual components of the sports accessory support stand of the subject disclosure and their relationship to one another will now be described with reference to the figures appended hereto. With reference to FIG. 1, a representative sports stand of the subject disclosure is provided. As can be seen with reference to FIG. 1A, a sports stand (10) may include a base member (20) and a support member (30). The support member (30) may include a plurality of posts elements (32, 34). The post elements (32, 34) extend radially away from the base member (20). Further, the post elements are be spaced apart from one another so as to form a receptacle (40). As indicated, the posts (32, 34) are positioned a distance (d) from one another wherein distance (d) varies along the length of the post elements. Hence, the receptacle (40) includes a first width (42) and a second width (44). As can be seen, a perch element is not included, rather the configuration of the post elements (32, 34) at the proximal portion serves the purpose of positioning a sports accessory in the proper orientation upon being received within the receptacle (40).

Figure 1B:
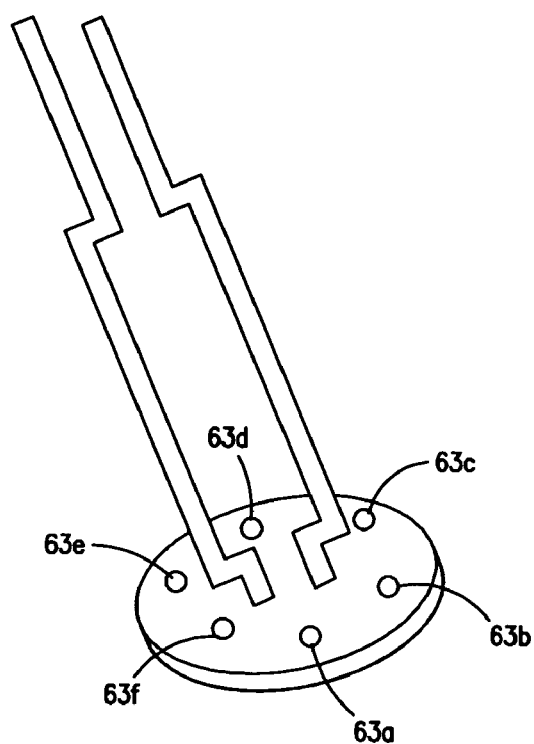
Figure 1C:
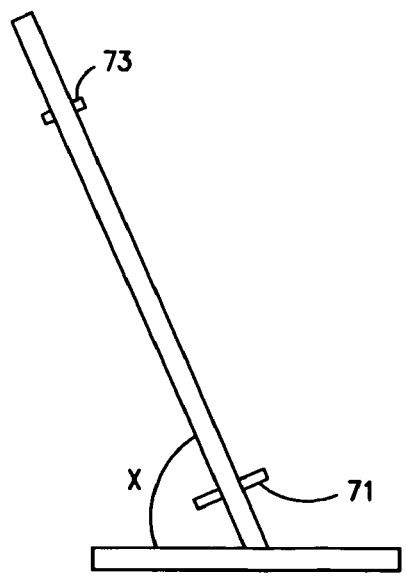

With reference to FIGS. 1B and 1C, the post elements (32, 34) of the support member (30) may be angled with respect to the base member (20), so as to accommodate and retain a sport accessory, such as a scooter, therein. In certain embodiments, the angle may range from about 30° or about 45° to about 60° or about 75° or about 90°. In certain embodiments, the base member, and/or any other member, may have one or more openings to as to receive a fastener there through. As depicted, the base member has openings 63a-f so as to secure the base member to a surface upon which the base member rests, e.g., by the insertion of fasteners through the base and a supporting material upon which the base rests. Further, as depicted in FIG. 1C, the support member may include a perch element 71 and a support connector 73.

Figure 2:
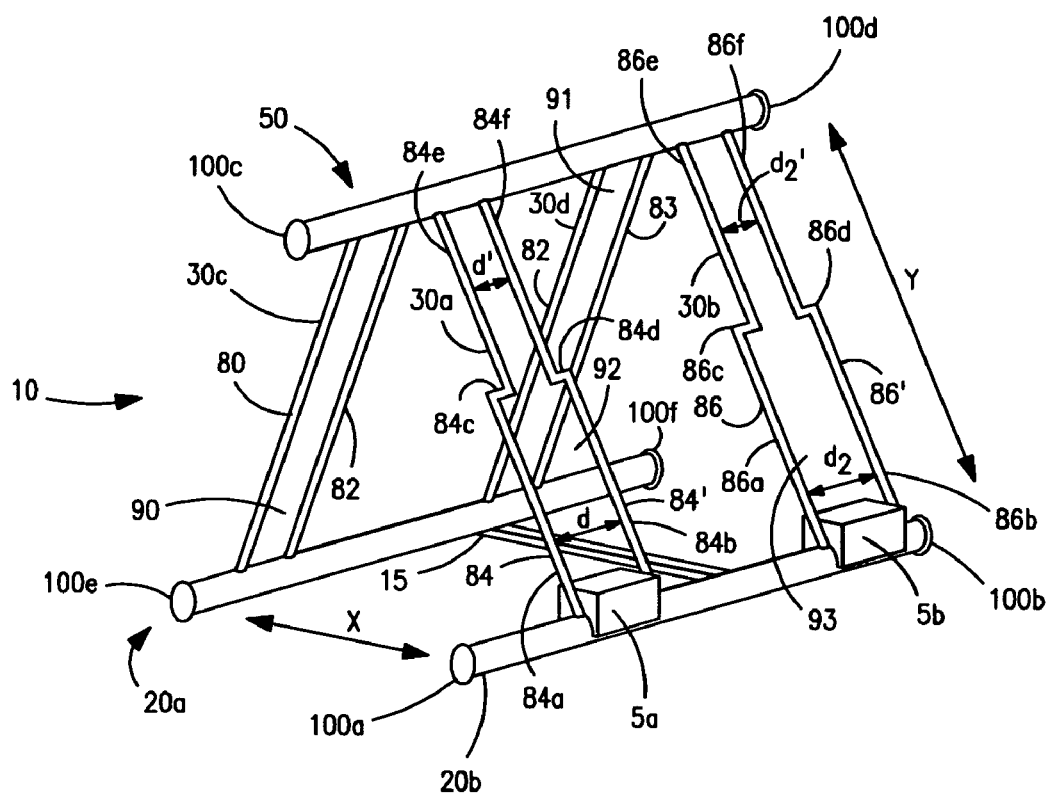
FIG. 2 depicts another representative embodiment of a subject sports accessory support stand.

With reference to FIG. 2, another representative embodiment of a sports stand of the subject disclosure is provided. As can be seen with reference to FIG. 2, the support stand (10) includes a plurality of base members (20a and 20b), a plurality of support members (30a, 30b, 30c, and 30d), and an apex member (50). The base and apex members are tubular and extended horizontally. The base members (20a) and (20b) are spaced apart from one another laterally by a distance X. Additionally, the apex member (50) is spaced apart vertically (e.g., longitudinally) from the base members (20a and 20b) by a distance Y. The two base members (20a and 20b) are connected to one another by a connector (15). Further, the two base members (20a and 20b) are also connected to the apex member (50) by support members (30c and 30d) and (30a and 30b), respectively, which support members are interposed there between the base and apex members.

As depicted, support members (30c) and (30d) include a plurality of straight, rigid post elements (80 and 81) and (82 and 83). Post elements (80 and 81) are parallel and spaced apart from one another to form a receptacle (90). Post elements (82 and 83) are parallel and spaced apart from one another so as to form a receptacle (91). As can be seen, receptacles (90 and 91) include a single width dimension along the entire length of the receptacle.

Further, as depicted, support members (30a) and (30b) include post elements (84 and 84') as well as (86 and 86'). Post elements (84 and 84') of support member (30a) each include a proximal portion (84a and 84b), an intercalating portion (84c and 84d), and a distal portion (84e and 84f). Proximal portions (84a) and (84b) are configured for being associated with base member (20b) and extend radially there from. Proximal portions (84a and 84b) are parallel to and distanced apart from one another by a distance d. Distal portions (84e) and (84f) are configured for being associated with apex member (50) and extend radially there from. Distal portions (84e and 84f) are parallel to and distanced apart from one another by a distance d'. As depicted distance d is greater than distance d'. However, in certain embodiments, distance d' is greater than distance d.

Intercalating portions (84c and 84d) are transverse to the proximal and distal portions of support (30a). For instance, although intercalating portions (84c and 84d) are in line with each other, they are perpendicular to the proximal and distal portions of support member (30a). Accordingly, proximal portions (84a and 84b) are offset from distal portions (84e and 84f). In this manner, a receptacle (92) formed between the two post elements 84 and 84' includes a first width defined by distance d and a second width defined by distance d', wherein the first width is greater than the second width.

Likewise, post elements (86 and 86') of support member (30b) each include a proximal portion (86a and 86b), an intercalating portion (86c and 86d), and a distal portion (86e and 86f). Proximal portions (86a) and (86b) are configured for being associated with base member (20b) and extend radially there from. Proximal portions (86a and 86b) are parallel to and distanced apart from one another by a distance d2. Distal portions (86e) and (86f) are configured for being associated with apex member (50) and extend radially there from. Distal portions (86e and 86f) are parallel to and distanced apart from one another by a distance d2'. As depicted distance d2 is greater than distance d2'. However, in certain embodiments, distance d2' is greater than distance d2.

Intercalating portions (86c and 86d) are transverse to the proximal and distal portions of support (30b). For instance, although intercalating portions (86c and 86d) are in line with each other, they are perpendicular to the proximal and distal portions of support member (30b). Accordingly, proximal portions (86a and 86b) are offset from distal portions (86e and 86f). In this manner, a receptacle (93) formed between the two post elements 84 and 84' includes a first width defined by distance d2 and a second width defined by distance d2', wherein the first width is greater than the second width. Further, although not shown, each individual post element may be connected to one another by a suitable bar or other connector configuration such that the support member forms a single connected unit.

Additionally, as depicted, the support stand (10) includes a plurality of perch elements (5a and 5b), which perch elements are associated with base member (20b) and further positioned within and/or otherwise associated with support members (30a and 30b, respectively). As indicated, perches (5a and 5b) are tubular, extended square members that are angled with respect to the ground upon which the base member rests.

In this embodiment, the tubular base and apex members include a lumen (not shown), thus, suitable plugs (100a, b, c, d, e, and f) are provided to fit within the ends of the tubular base and apex members. Additionally, as can be seen with reference to FIG. 2, a sports accessory may be received within either a front or rear side of the support stand (10).

Figure 3:
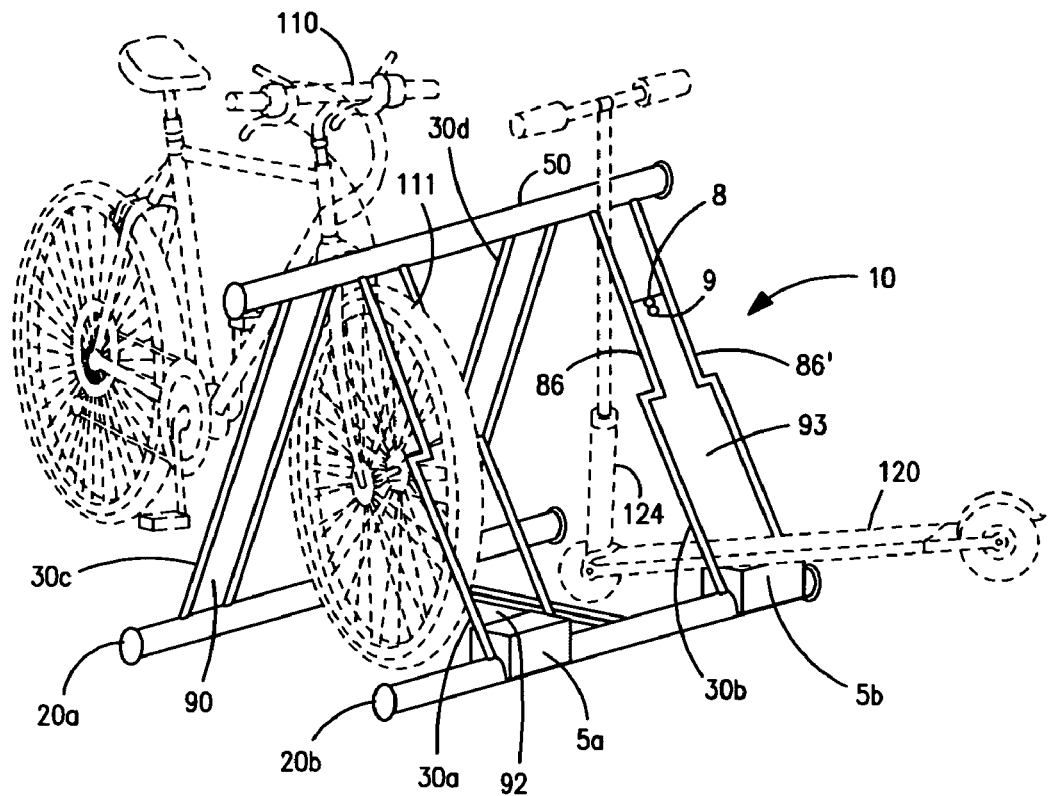
FIG. 3 depicts the representative embodiment of the subject sports accessory support stand of FIG. 2, with a plurality of sports accessories received therein.

With reference to FIG. 3, a representative embodiment of the sports stand of FIG. 2 is provided with a plurality of suitable sports accessories received therein. As can be seen with reference to FIG. 2, the support stand (10) includes a plurality of base members (20a and 20b), a plurality of support members (30a, 30b, 30c, and 30d), and an apex member (50). The support members (30c, 30a and 30b) include receptacles (90, 92 and 93), which receptacles include sports accessories (110) and (120).

As depicted, receptacle (90) of support member (30c) is configured for receiving a portion of a sports accessory, such as a front wheel (111) portion of a bicycle (110). As can be seen, the front wheel portion (111) of bicycle (110) enters into receptacle (30c) and may further be received within receptacle (92) of support member (30a). Accordingly, by inserting wheel portion into support member (30c), support member (30c) may retain and support bicycle (110) in an up-right position, while the bicycle is not in use. Further, in certain embodiments, front wheel portion may contact and rest upon perch element (5a), although the perch element (5a) should not prevent wheel (111) from entering the stand (10) and being supported thereby. However, in certain embodiments, the distal portion of the support members are moveably associated with the apex member, and thus are capable or pivoting in relation thereto, such that the base members, connected to the support members, may be positioned closer or further away from one another, and or the rack may be collapsed entirely. A suitable locking mechanism may therefore be include, such as a pin element, to lock the rack into a non-moveable configuration.

Further, as depicted, receptacle (93) of support member (30b) is configured for receiving a portion of a sports accessory, such as a front portion (121) of a scoter, such as a foot scooter with in-line wheels (120). As can be seen, the front wheel portion (121) of scooter (120) enters into receptacle (30b). As set forth above, given the configuration of the support member (30b), specifically with reference to the post elements (86 and 86'), support member (30b) is adapted to receive a front portion of a scooter (120) so as to support and/or store the scooter (120) in an upright position while it is not in use. Accordingly, a perch element (5b) may be included so as to be associated with the scooter (120) and thereby position the scooter to be received and retained within the receptacle (30b). A locking clasp element (8) with a suitable lock (9) may be included so as to lock the accessory in place within the rack, once inserted therein and locked.

Figure 4:
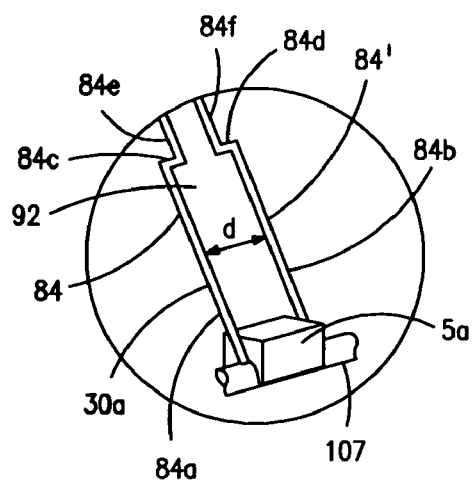
FIG. 4 depicts a representative embodiment of the support member set forth in FIG. 2.

With reference to FIG. 4, a representative embodiment of a proximal region of a support member of the sports stand of FIG. 2 is provided. As can be seen with reference to FIG. 4, the support stand (10) includes a support member (30a), which support member includes post elements (84 and 84'). Post elements (84 and 84') of support member (30a) each include a proximal portion (84a and 84b), an intercalating portion (84c and 84d), and a distal portion (84e and 84f). As depicted, proximal portions (84a) and (84b) are connected to one another by connector bar element (107). A perch element (5a) is also included and angled with respect to a top surface of the connector bar (107).

As can be seen with reference to FIG. 4, proximal portions (84a and 84b) are parallel to and distanced apart from one another by a distance d. Intercalating portions (84c and 84d) are transverse to the proximal and distal portions of support (30a). Accordingly, proximal portions (84a and 84b) are offset from distal portions (84e and 84f). In this manner, a receptacle (92) formed between the two post elements (84) and (84') includes a first width that is capable of receiving a sports accessory, such as an in line foot scooter. The perch element (5a) is included so as to position a scooter to be received and retained within the receptacle (30a).

Figure 5:
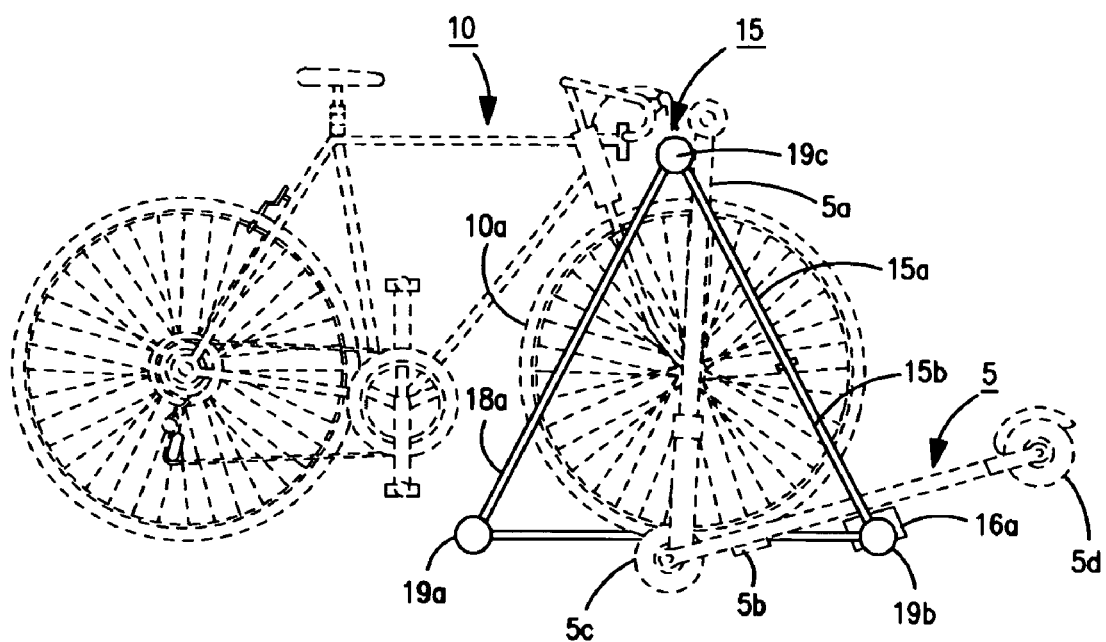
FIG. 5 depicts a profile view of a representative embodiment of a subject sports accessory support stand with a plurality of sports accessories received therein.

With reference to FIG. 5, another representative embodiment of a sports stand of the subject disclosure is provided in a profile configuration. FIG. 5 depicts both a bicycle 10, and, or an inline foot scooter 5 as they would be supported by the stand 15. An in-line foot scooter 5 with two in-line wheels located at each end is shown as it would be when placed in between one pair of vertical support members, which combined form a narrow top section 15(a), and a wide bottom section 15(b). An in-line foot scooter is shown therein with its chassis 5(b) resting on the stand support base member 16(a) of the stand 15.

The stand support base member 16(a) is shown therein mounted at an angle specifically to tip the in-line foot scooter chassis 5(b) forward. This allows the front wheel 5(c) of the in-line scooter to rest on the ground, but raised the rear wheel 5(d) off of the ground while tipping the scooter forward into the narrow vertical support members 15(a), which support the in-line foot scooter in an upright position, keeping it from rolling backwards, and does so without inhibiting the in-line foot scooter 5 from passing through the vertical support members 15(a), and 15(b).

The vertical support members 15(a) and 15(b) are interconnected to an additional pair of opposing vertical support members 18(a), which are then connected to two horizontal base members 19(a), and 19(b), and one horizontal top member 19(c) in a triangulated fashion. The in-line foot scooter stand support base member 16(a) combined with the elongated vertical support members 15(a), and 15(b) hold the in-line foot scooter vertical guide shaft 5(a) and chassis 5(b) in place, and work in combination with the other interconnected support members of the stand to secure the in-line foot scooter 5 in a parked upright position.

The front wheel 10(a) of a bicycle 10 is shown as it would be placed in between the same pair of vertical support members with a narrow top section 15(a), and wider bottom section 15(b), that could be used to support an inline foot scooter. This view shows how the support base member 16(a) is mounted in such a way so as not to inhibit the wheel of a bicycle from being inserted in between the pair of vertical support members with a narrow top section 15(a), which holds the wheel of the bicycle 10, and the wider bottom section 15(b), where the support base member 16(a) is mounted. The vertical support members 15(a), and 15(b) are interconnected to an additional pair of opposing vertical support members 18(a), which are then connected to two horizontal base members 19(a), and 19(b), and one horizontal top member 19(c) in a triangulated fashion, which work in combination with the other interconnected support members of the stand to secure the bicycle 10 in a parked upright position.

Figure 6A:
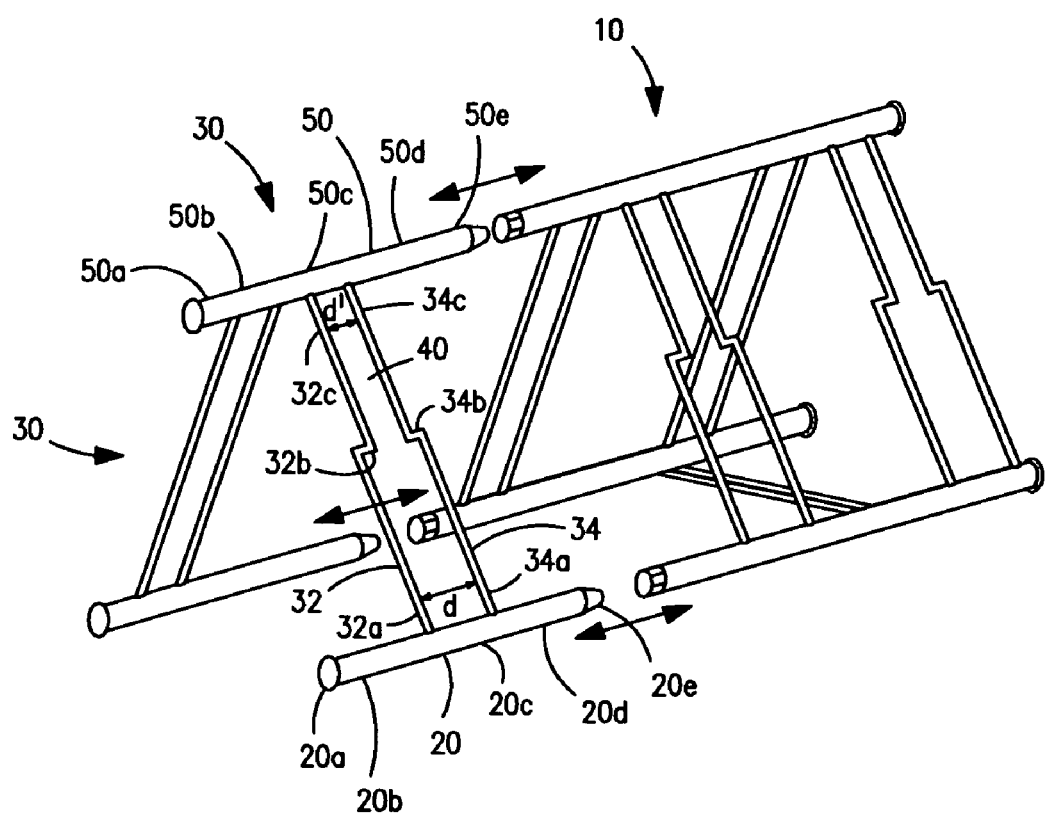
FIG. 6 depicts a representative embodiment of a support member configured for acting as a support stand on its own, or for being coupled to a pre-existing support stand.
Figure 6B:
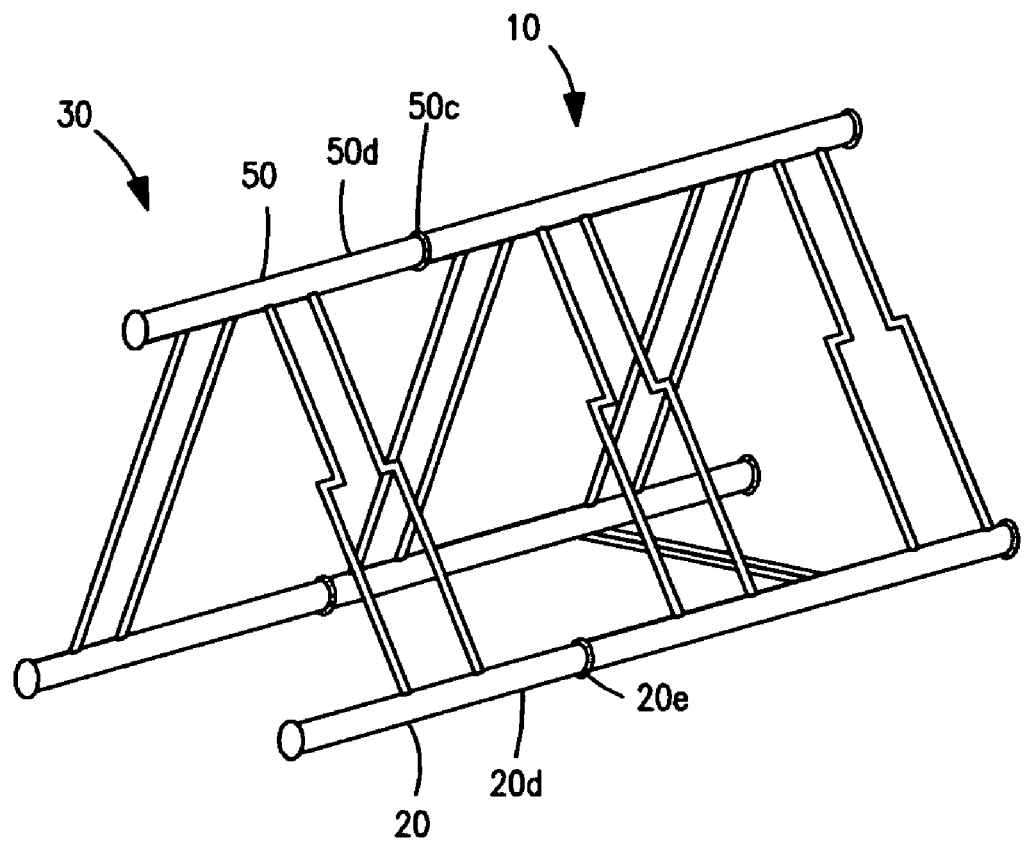

FIG. 6, illustrates an accessory support member for attachment to a sports accessory stand. For instance, FIG. 6 provides a support member that is configured for being coupled to a pre-existing sports stand, such as a bike rack, in order to adapt the bike rack to accommodate an additional sports accessory, such as a scooter. As can be seen with reference to FIG. 6, the support member (30) includes a plurality of straight, rigid post elements (32 and 34), which are parallel and spaced apart from one another to form a receptacle (40). The post elements (32 and 34) of support member (30) each include a proximal portion (32a and 34a), an intercalating portion (32b and 34b), and a distal portion (32c and 34c). Proximal portions (32a and 34a) are configured for being associated with base member (20) and extend radially there from. Proximal portions (32a and 34a) are parallel to and distanced apart from one another by a distance d. Distal portions (32c) and (34c) are configured for being associated with apex member (50) and extend radially there from. Distal portions (32c and 34c) are parallel to and distanced apart from one another by a distance d'. As depicted distance d is greater than distance d'. Intercalating portions (32b and 34b) are transverse to the proximal and distal portions of support (30). For instance, although intercalating portions (32b and 34b) are in line with each other, they are perpendicular to the proximal and distal portions of support member (30). Accordingly, proximal portions (32a and 34a) are offset from distal portions (32c and 34c). In this manner, a receptacle (40) formed between the two post elements 32 and 34 includes a first width defined by distance d and a second width defined by distance d', wherein the first width is greater than the second width.

In this embodiment, the base (20) and apex (50) members are tubular, extended, and include a lumen (not shown). The extended base (20) member includes a proximal portion (20b) with a proximal end (20a), an intercalating portion (20c), and a distal portion (20d) with a distal end (20e). The extended apex (50) member includes a proximal portion (50b) with a proximal end (50a), an intercalating portion (50c), and a distal portion (50d) with a distal end (50e). The distal portions of the base and apex members (20d and 50d), respectively, are configured such that the distal base end (20e) and the distal apex end (50e) may be fit within and inserted into corresponding ends of an already existing sports accessory stand, such as bike rack (10). For instance, as depicted, the distal base and apex ends are tapered so as to be inserted within corresponding end members of rack (10). Accordingly, as can be seen with reference to FIG. 6B, support member (30) may be coupled and joined to bike rack (10) by the insertion of the base and apex insertion ends of the support member (30) into corresponding receiving ends of bike rack (10).

It is to be understood that although the coupling of the support member (30) with the bike rack (10) is depicted as being via the insertion of the base and apex insertion ends of the support member (30) into corresponding receiving ends of bike rack (10), this coupling may be produced by any number of ways well known in the art, such as by the use of an intervening adaptor member, a clasping member, a bracket member, and the like.

Figure 7A:
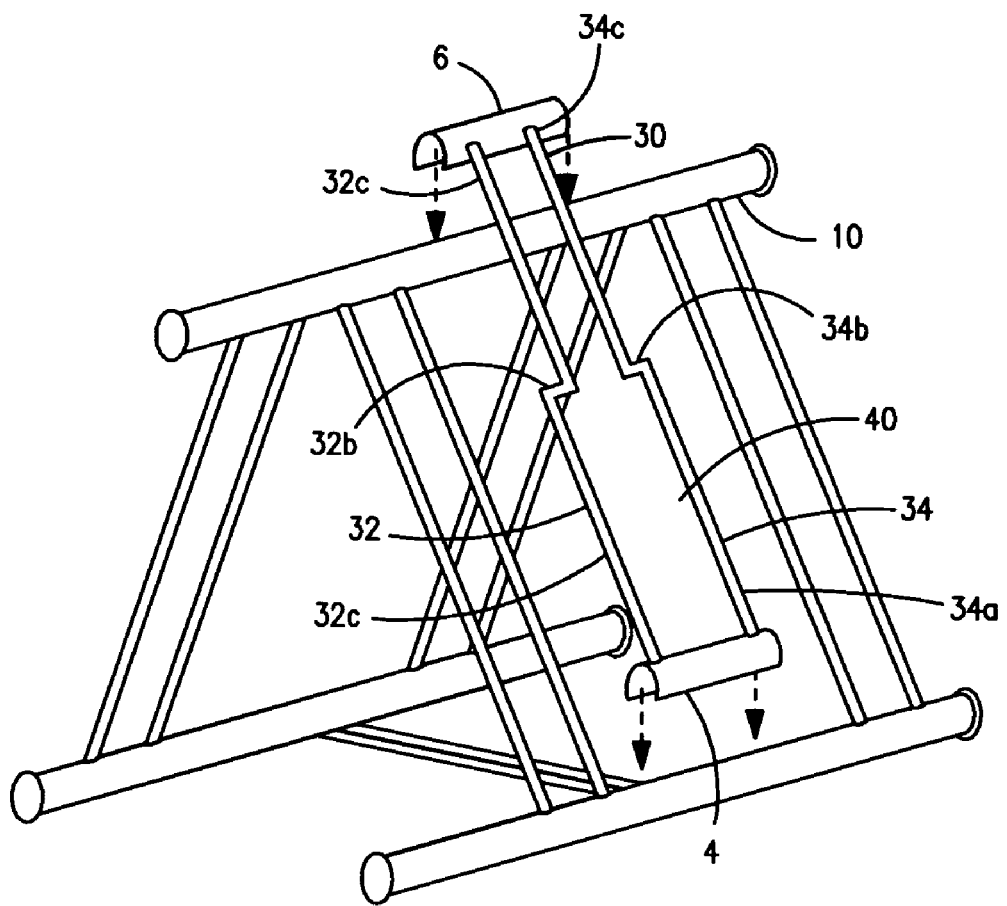
FIG. 7 depicts a representative embodiment of a support member configured for being coupled to a pre-existing support stand.
Figure 7B:
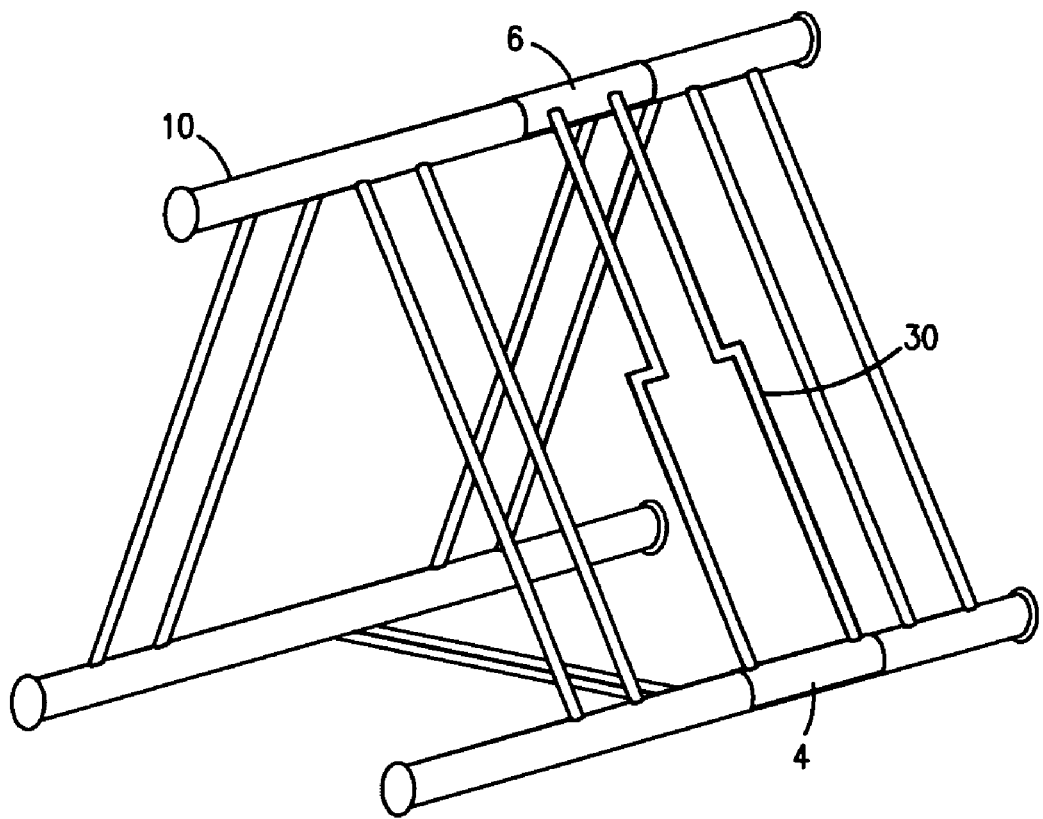

With reference to FIG. 7, FIGS. 7A and 7B illustrate an alternative support member that is adapted for being attached to a pre-existing sports accessory stand. For instance, the support member 30 includes a plurality of straight, rigid post elements (32 and 34), which are parallel and spaced apart from one another to form a receptacle (40). The post elements (32 and 34) of support member (30) each include a proximal portion (32a and 34a), an intercalating portion (32b and 34b), and a distal portion (32c and 34c). Proximal portions (32a and 34a) are configured for being associated with clasping member (4) and extend radially there from. Distal portions (32c) and (34c) are configured for being associated with clasping member (6) and extend radially there from. Clasping members (4) and (6) are of a dimension so as to allow the support member (30) to be coupled to preexisting sports accessory stand (10) by the interaction of the clasping members with corresponding base and apex portions.

Accordingly, clasping members (4 and 6) have dimensions that are equivalent to the dimensions of the base and apex members to which they are to be joined (but slightly larger) and are configured so as to allow said joining, for instance, by the "snapping in" of the support member (30) into the stand (10). It is to be understood that although support member 30 has been depicted with both a base and apex clasping member, in certain embodiments only one clasping member need be present, for instance, when the post elements are made of sufficient stiffness to allow the reception of a sports accessory in proper alignment without the need of an additional clasping member. Further, although the coupling of the support member (30) with the rack (10) is depicted as being via the clasping of the clasping members (4 and 6) of support member (30) to corresponding base and apex members of bike rack (10), this coupling may be produced by any number of ways well known in the art, such as by the use of screw holes and screws, hook members, bracket members, and the like. Accordingly, in this manner the support member (30) may be removeably associated with a pre-existing stand, as shown in FIG. 7B.

Figure 8A:
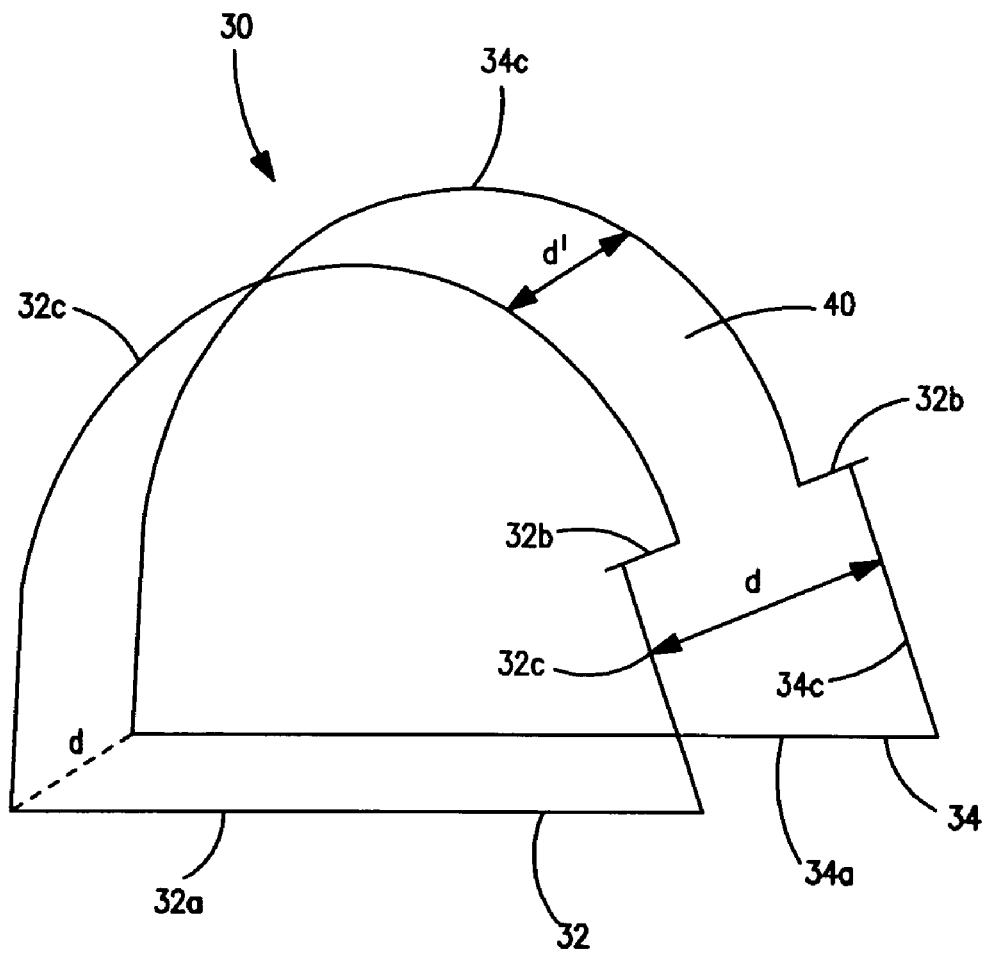
FIG. 8 depicts a representative embodiment of a support member configured for acting as a support stand on its own.

FIG. 8 illustrates another embodiment of a sports accessory support stand of the subject disclosure for retaining a sports accessory, such as a scooter, wherein the support stand includes a single support member (30). The support member (30) is rounded and includes a plurality of curved post elements (32) and (34). Post elements (32 and 34) are parallel and spaced apart from one another to form a receptacle (40). The post elements (32 and 34) of support member (30) each include a proximal portion (32a and 34a), an intercalating portion (32b and 34b), and a distal portion (32c and 34c). Proximal portions (32a and 34a) include a first and a second section, wherein the first section is relatively flattened and the second section is raised and angled with respect to the first section. In this manner the first section of the proximal portions (32a) and (34b), may perform the function of a base so as to give the support member (30) stability.

As can be seen with reference to FIG. 11A, the second sections of proximal portions (32a) and (34a) are transverse to the first sections, parallel to and distanced apart from one another by a distance d. Distal portions (32c and 34c) are not parallel to one another but rather are angled with respect to one another such that the distanced d', which distance separates distal portion 32c from distal portion 34c varies, e.g., increases, along the length of the distal portion, e.g., until distance d' substantially approximates distance d. Specifically, the distal portions (32c and 32d) of post elements (32) and (34) may be angled with respect to one another, e.g., angled away from one another, such that when distal portions (32c and 34c) contact proximal portions (32a and 34a), the two post elements (32 and 34) are separated at a distance d from one another.

Intercalating portions (32b and 34b) are transverse to the second section of proximal and distal portions of support (30). For instance, although intercalating portions (32b and 34b) are in line with each other, they are perpendicular to the proximal and distal portions of support member (30). Accordingly, the second section of proximal portions (32a and 34a) are offset from distal portions (32c and 34c). In this manner, a receptacle (40), which is formed between the two post elements 32 and 34, includes a first width defined by distance d and at least a second width defined by distance d', wherein the first width is greater than the second width.

Figure 8B:
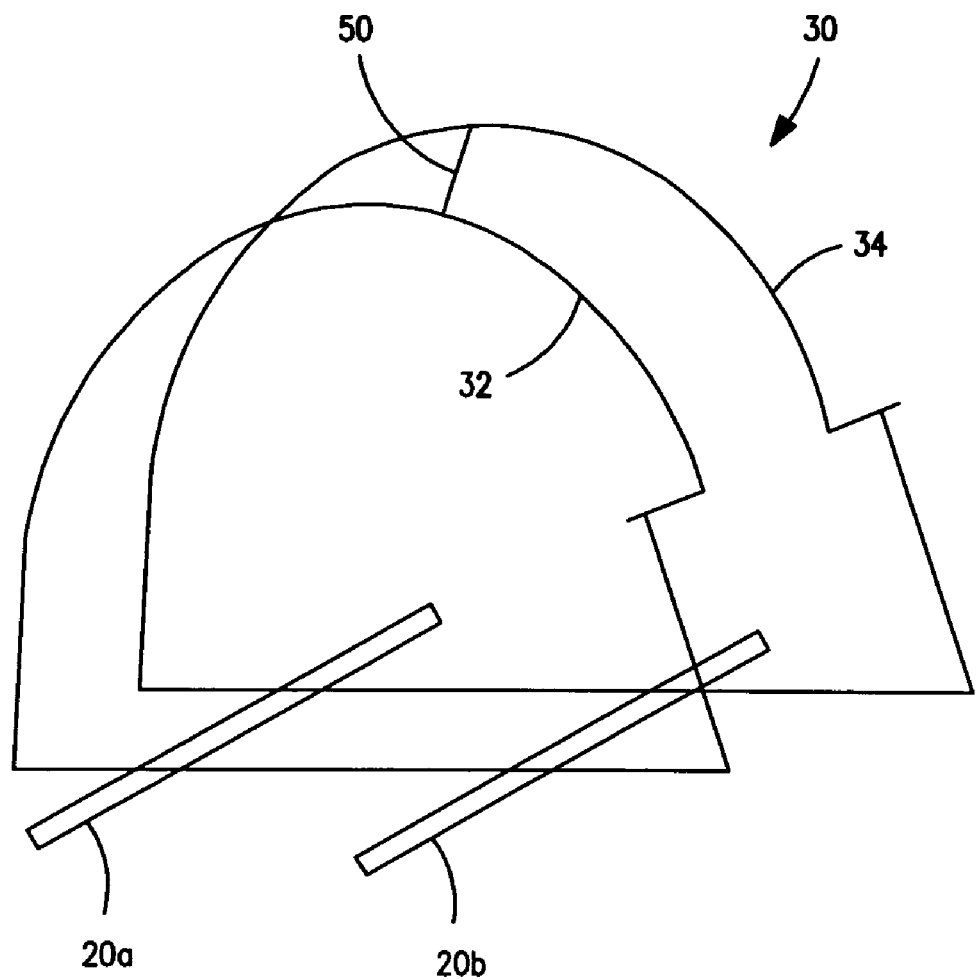

As can be seen with reference to FIG. 8B, the rounded support stand of FIG. 11A may additionally include one or more base members (20a and 20b) and/or an apex member (50). A suitable perch member may also be removeably associated with the support member (30).

All publications and patents cited in this specification are herein incorporated by reference as if each individual publication or patent were specifically and individually indicated to be incorporated by reference.

While the invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the invention. All such modifications are intended to be within the scope of the claims appended hereto.

What is claimed is:

1. A sport accessory support stand for retaining a sport accessory, comprising:
   a) a plurality of horizontally extended base members each comprising a top surface;
   b) a horizontally extended apex member longitudinally spaced apart from said base member and extending parallel to said base members;
   c) a plurality of support members associated with said base members and said apex member, each comprising a plurality of substantially parallel post elements extending radially between said top surface of the base members and said apex member and defining a receptacle between two adjacent ones of said post elements,
   wherein each of said plurality of post elements are positioned relative to one another so as to form the receptacle there between for receiving a portion of a sport accessory,
   wherein at least one of said receptacles comprises a first width and a second width, the first width being up to about 7 inches and the second width being up to about 4 inches.

2. The sport accessory support stand according to claim 1, further comprising a plurality of apex members longitudinally spaced apart from said base member.

3. The sport accessory support stand according to claim 1, wherein said support members are interposed between said base members and said apex member.

4. The sport accessory support stand according to claim 1, further comprising a plurality of perches coupled to said base members and spaced apart from one another.

5. The sport accessory support stand according to claim 4, further comprising a connector configured for connecting at least two of said plurality of base members.

6. The sport accessory support stand according to claim 5, wherein said connector comprises an additional support member.

7. The sport accessory support stand according to claim 1, wherein each of said post elements comprise a proximal portion with a proximal end, a distal portion with a distal end, and an intercalating portion between said proximal and distal portions.

8. The sport accessory support stand according to claim 7, wherein said proximal portions of said post elements are configured for being removably associated with said base member.

9. The sport accessory support stand according to claim 8, wherein said distal portion of said post elements are configured for being removably associated with said apex member.

10. The sport accessory support stand according to claim 1, wherein said first width is configured for receiving a portion of a first sport accessory.

11. The sport accessory support stand according to claim 10, wherein said portion of said first sport accessory is a front wheel portion of a bicycle.

12. The sport accessory support stand according to claim 11, wherein said second width is configured for receiving a portion of a second sport accessory.

13. The sport accessory support stand according to claim 12, wherein said portion of said second sport accessory is a front portion of a scooter.

14. The sport accessory support stand according to claim 1, further comprising a perch associated with the top surface of said base member.

15. A sport accessory support stand for retaining a sport accessory, comprising:
- a) a laterally extended base member;
- b) at least one laterally extended apex member set apart from and extending parallel to said base member;
- c) a plurality of support members associated with said base and apex member, said plurality of support members each comprising a plurality of substantially parallel post elements extending radially between the base and apex member and defining a receptacle between two adjacent ones of said post elements, wherein each of the plurality of post elements are positioned relative to one another so as to form the receptacle there between for receiving a portion of a sport accessory wherein at least one of said receptacles comprises a first width and a second width.

* * * * *